Aug. 18, 1942.    R. L. KENYON ET AL    2,293,344
DEVICE FOR TESTING CAR WHEELS
Filed Dec. 15, 1939    3 Sheets-Sheet 3

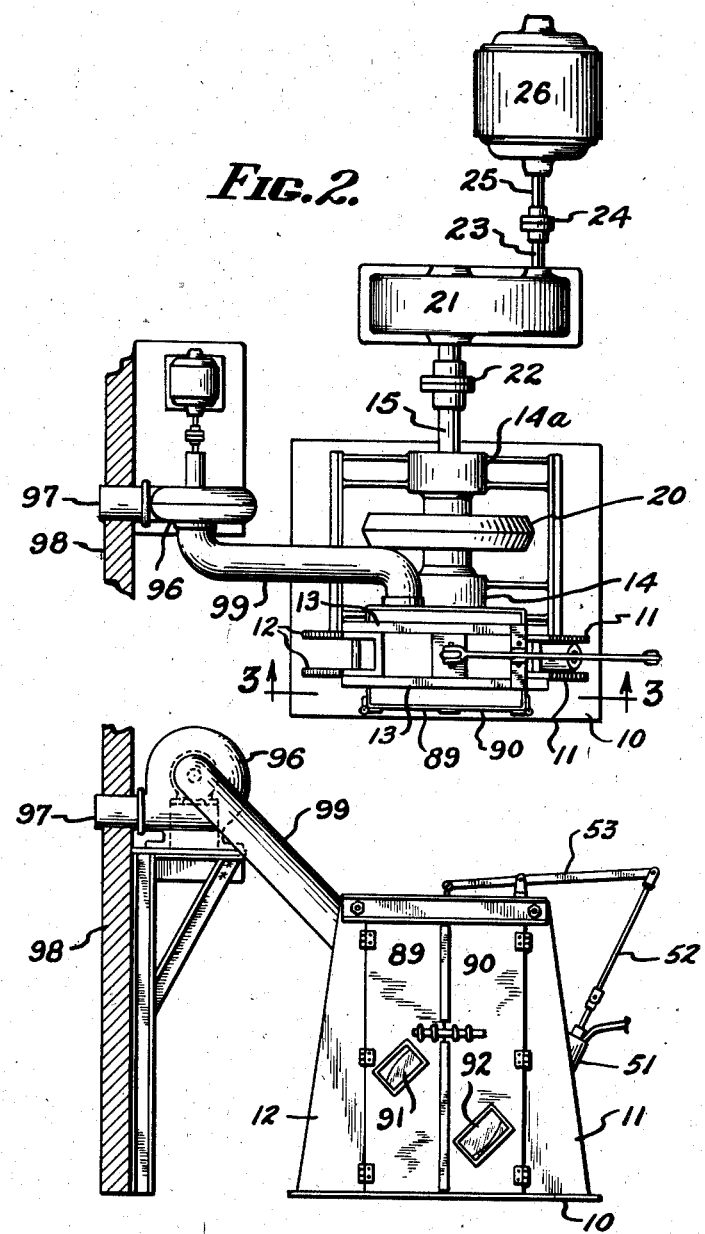

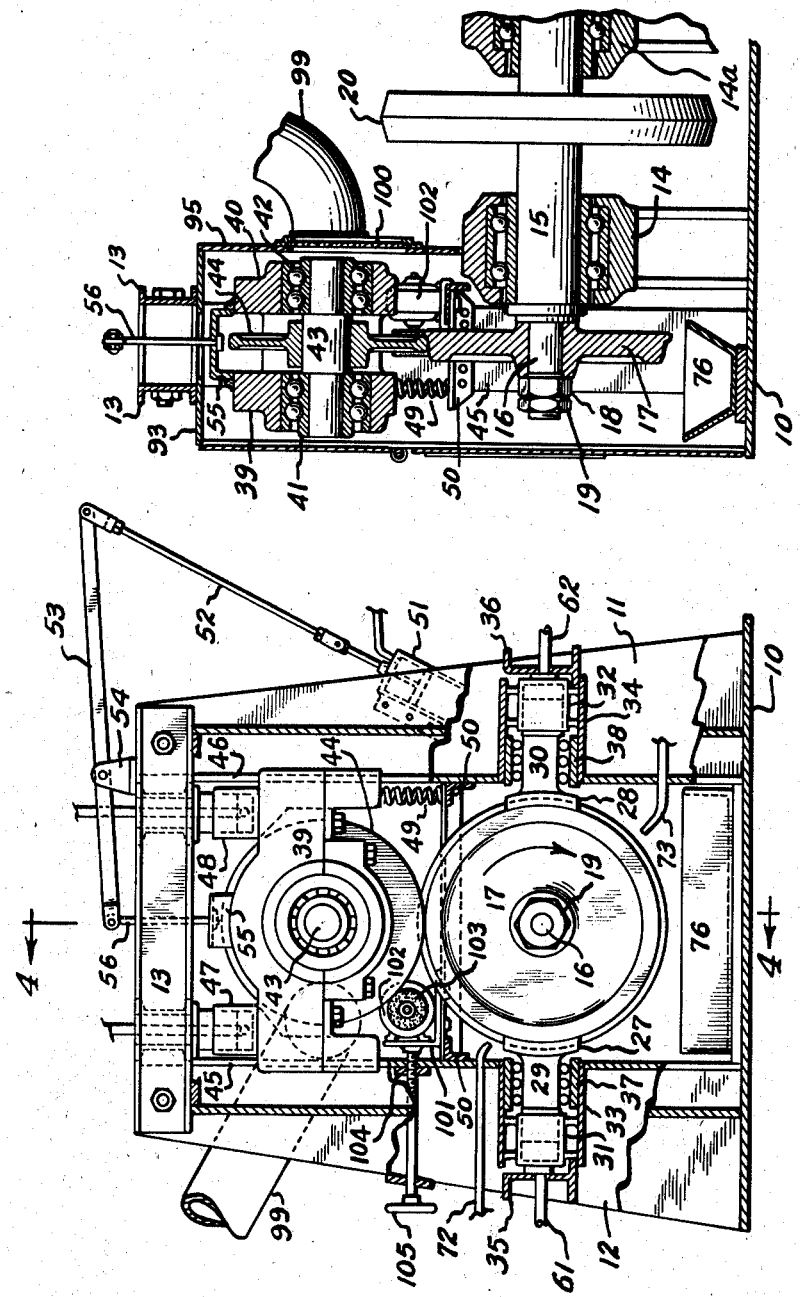

INVENTORS.
REID L. KENYON,
HARRY TOBIN,
BY    AND ROY P. TOOKE.
Allen & Allen
ATTORNEYS.

Patented Aug. 18, 1942

2,293,344

UNITED STATES PATENT OFFICE 2,293,344

DEVICE FOR TESTING CAR WHEELS

Reid L. Kenyon, Middletown, Ohio, and Harry Tobin and Roy P. Tooke, Butler, Pa., assignors to The American Rolling Mill Company, Middletown, Ohio, a corporation of Ohio Application December 15, 1939, Serial No. 309,424

18 Claims. (Cl. 73—51)

Our invention is addressed to the problem of providing adequate testing means for the determination of certain of the physical characteristics of car wheels which they exhibit in service. Hitherto, so far as we are aware, there has not been any adequate apparatus for performing such tests either on a normal time scale or on an accelerated time scale, which latter, of course, is preferable. It has been necessary to rely upon field experience for the characteristics of car wheels. The accumulation of data by field experience is not only a slow process, but does not give in advance of actual use the characteristics of the articles, so that field experience entails danger not only to property, but also to life, if the articles are not capable of withstanding the conditions to which they are subjected. The disadvantages of this have been realized, so much so that elaborate and costly proving grounds in which the wheels could be subjected to actual conditions with rolling stock and suitable motive means have been suggested.

It is an object of our invention to provide an apparatus of simple and inexpensive character compared with the proposals hitherto made for testing car wheels.

It is an object of our invention to provide a simple unitary apparatus inexpensive to construct yet which will give through its proper employment all of the data exclusive of metallurgical data, pertinent to the performance of car wheels in actual service.

It is an object of our invention to provide an apparatus in which the data required can be secured by subjecting the article to accelerated and intensified conditions.

More specifically, it is an object of our invention to provide a machine which will give with respect to a car wheel, within a commercially brief testing period, data upon thermal checking and cracking, shelling, the development and relief of stresses, wear, and the degree and direction of stresses in any desired localized portion of the article. More broadly, it is our object to provide an apparatus which will give with respect to a car wheel complete data as to the performance and safety thereof within a commercially brief testing time.

These and other objects of our invention which will be set forth hereinafter or will be apparent to one skilled in the art upon reading these specifications, we accomplish by that certain construction and arrangement of parts of which we shall now describe a specific embodiment, reference being had to the drawings which form a part hereof, and in which:

Figure 1 is a front elevational view of the assembled apparatus with the housing doors closed.

Figure 2 is a top plan view of the apparatus.

Figure 3 is a vertical sectional view of the apparatus with front housing portions removed and taken along the lines 3—3 of Figure 2.

Figure 4 is a vertical sectional view taken along the lines 4—4 of Figure 3.

Figure 5:
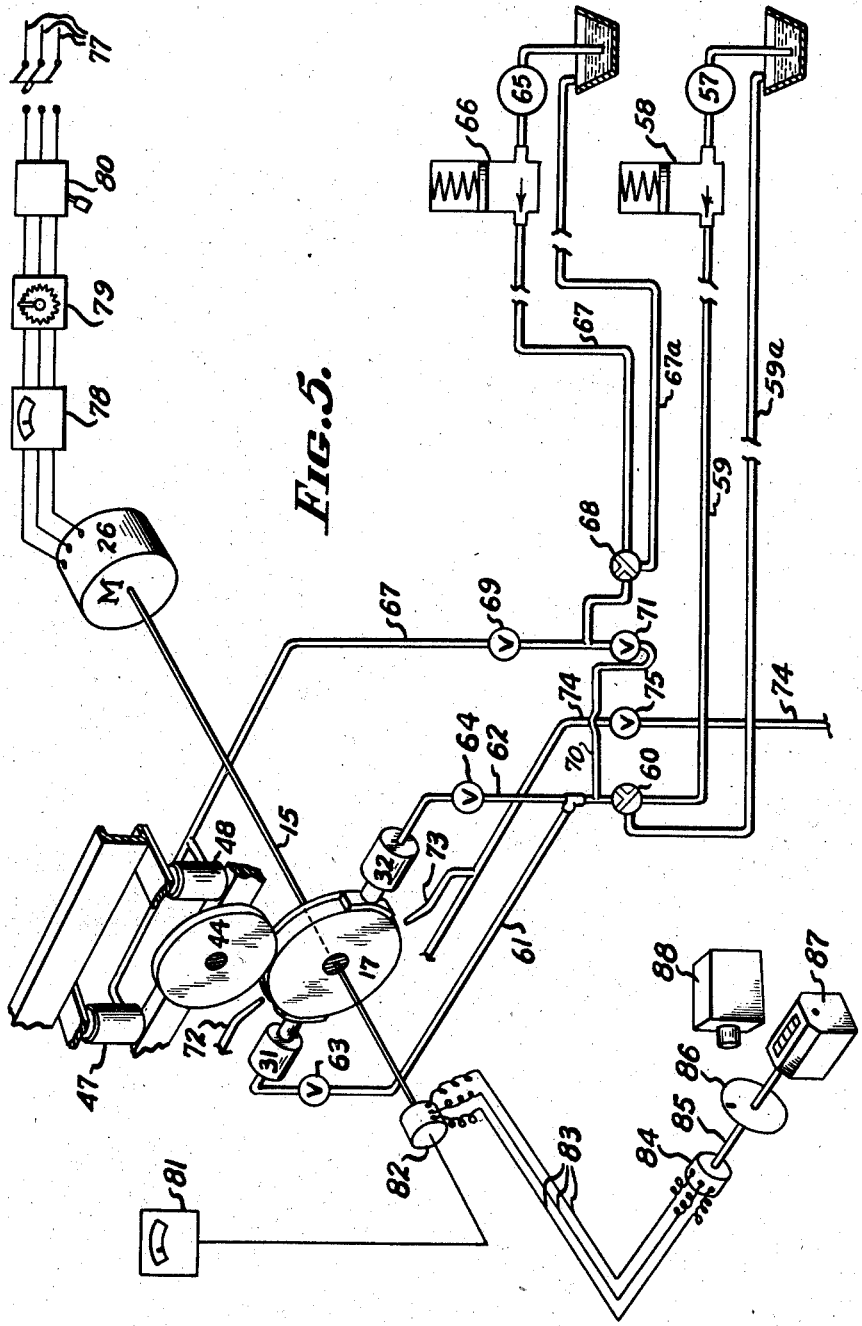
Figure 5 is a schematic view of the apparatus, connections and controls.

In the practice of our invention we provide means for mounting and rotating under heavy power and at desired speeds a wheel to be tested together with means for applying braking pressure to the wheel under controlled conditions, together with means for controlling and varying the temperature of the wheel, together with means for operating the wheel under all of these conditions and under conditions similar to axle loads, and together with control means for all of the factors involved.

In the embodiment of our invention which we shall describe, we provide on a suitable base 10, a framework consisting of uprights 11 and 12 and top frame members 13 all of suitably strong and rigid construction. In suitable bearings 14 and 14a preferably mounted on this frame or rigidly connected to it, we provide a drive shaft 15 having a spindle portion 16 to which a car wheel 17 to be tested may be fastened. The car wheels for test may be mounted upon the spindle in any desired way. In actual practice the hubs of the car wheels are taper-bored and provided with a key and key-way, cooperating with complementary portions of the spindle; and the wheel being tested is held on the spindle by a nut and lock nut arrangement 18, 19. The shaft 15 is provided with a heavy flywheel 20 to give an inertia effect approximating the inertia of heavy rolling stock. We prefer to provide in connection with the flywheel means whereby additional weights may be symmetrically connected thereto to vary the inertia effect. While we have not illustrated this, it will be within the skill of the worker in the art to provide. In practice we make additional weight members in the form of rings which are suitably perforated so that they can be attached to the body of the flywheel by bolts and drawn onto the tapered edge of the flywheel to maintain balance and concentricity. In Figure 2 we have shown the shaft 15 connected to a speed changing gear box 21 through a resilient connection or universal 22, and the driven shaft 23 of the gear box connected by another universal 24 to the shaft 25 of a heavy duty, large horsepower motor 26. By the means just described the test wheel may be rotated at desired speeds under conditions of high inertia.

For the application of braking pressure to the wheels (as clearly shown in Figure 3), we provide brake shoe holders 27 and 28 preferably located horizontally on opposite sides of the test wheel. The braking pressure is applied hydraulically and to this end a convenient construction comprises the direct attachment of the brake shoe holders to pistons 29 and 30 of hydraulic cylinders 31 and 32. These cylinders are held in bracket means 33 and 34 on the upright members 12 and 11. They may be and preferably are held therein slidably. Back stop means suitably braced and attached to the frames are provided as at 35 and 36. If the cylinders 31 and 32 are slidable, compensation may be effected for wheels of different diameters by the use of shims or blocks between the cylinders and the back stops. Bearing means 37 and 38 may be provided for the pistons 29 and 30. The brake shoe holders 27 and 28 carry removable brake shoes (not shown) which may be of ordinary type and carried in the ordinary way, or may be shoes of special types if desired.

For the application of loading pressure to the wheel under test we provide the mechanism next to be described, which is most clearly shown in Figures 3 and 4. Frame members 39 and 40 are provided with bearings 41 and 42 for a shaft 43 on which a wheel 44 is mounted. The frame members 39 and 40 are slidable vertically in ways 45 and 46 on the frame uprights 12 and 11. The wheel 44 is so disposed as to bear peripherally on the rim of the wheel under test; and the rim of the wheel 44 is preferably shaped like the crown of a railroad rail so as to give the same type of bearing contact. Other types of contours can be used to vary the area of contact or other factors for test purposes. For loading the wheel 44 (hereinafter called the rail wheel) so as to give controlled conditions of axle load, we interpose betwen the top frame member 13 and the sliding frame members 39 and 40 hydraulic cylinder arrangements 47 and 48. By the introduction of suitable hydraulic pressures into these, the axle load may be varied as desired.

Since not all tests are intended to be conducted under conditions of axle load, means are provided to retract the frame members 39, 40 and the rail wheel when desired. The weight of these members may be somewhat counterbalanced by springs 49 interposed between various portions of the frame members and brackets 50 on the main frame; but lifting means are also provided. While a winch or the like may be employed, we have found it preferable to provide an air cylinder (51, Figure 3) which is connected by a linkage 52 to a lever 53 fulcrumed on brackets 54 on the top frame member 13. One end of the lever overlies a connection 55 between the slidable frame members 39, 40 and is connected thereto by a cable or linkage 56. By actuating the air cylinder 51 (which is mounted on the main frame as shown) the rail wheel and its mounting may be readily and quickly lifted out of the way. A lock may be provided to hold it up.

In Figure 5 we have shown diagrammatically a series of connections and controls for the various elements which we have above described, these elements being indicated by the same index numerals. To supply hydraulic power to the hydraulic elements we provide a pump 57 connected to an accumulator 58 and, by means of a line 59 containing a three-way control valve 60, to the brake cylinders 31 and 32 by means of branch lines 61 and 62. It is convenient to place valves 63, 64 in these branch lines respectively since in the performance of certain tests it may be desirable to apply braking pressure to the wheel 17 from one side only or alternately from two sides. The valves 63 and 64, however, may conveniently be located at or near the machine of Figures 1 to 4.

To actuate the loading cylinders 47, 48 of the rail wheel, we provide another pump 65 feeding an accumulator 66 and connected by a line 67, through a three-way control valve 68, to the said cylinders. The accumulator 66 will usually be loaded considerably less than the accumulator 58, which is preferably set up for high pressure brake applications. In the making of certain tests light and heavy brake applications are desired, and instead of varying the loading of the accumulator 58 we find it convenient to provide a branch connection between the line 67 from accumulator 66 and the line 59 from accumulator 58. This branch connection is indicated at 70 and is valved as at 71. A valve 69 may also be located in the line 67 beyond the branch line. This valve may conveniently be placed on or near the machine of Figures 1 to 4. With this connection it is possible to change over to operate the brake cylinders 31 and 32 from accumulator 66 by closing the three-way valve 60 with respect to line 70, closing valve 69, and opening valve 71. In Figure 5 we have indicated return pipes 59a and 67a in each of the hydraulic systems. Upon turning three-way valves 60 and 68 to the proper position, these pipes serve to release the pressure in the hydraulic cylinders 31, 32, 47 and 48 and permit the return of the fluid to the reservoir which supplies pumps 57 and 65 when it is desired to release the braking pressure from the wheel, or the rail wheel pressure.

Referring again to Figure 3 we provide means in connection with the wheel under test for cooling it and changing its temperature very rapidly by means of a flood of water or other cooling fluid. For this purpose we have indicated nozzles 72 and 73 arranged to flood the wheel with the cooling fluid adjacent the point of brake application. We ordinarily employ four nozzles. Other arrangements of the nozzles may, however, be made within the scope of our invention and the number of nozzles increased or decreased as desired. We have shown the nozzles 72, 73 connected to a conduit 74 for cooling fluid, the said conduit being valved at 75. Ordinarily we employ for cooling purposes water at city-supply temperatures, but it is within the scope of our invention to provide a tank for water in which tank ice or the evaporator of a refrigerating machine may be placed to cool the water to specified temperatures in making certain tests. Other fluids may be used to extend the temperature range of treatments below that of the freezing point or above the boiling point of water. We have not illustrated a cooling apparatus in connection with the conduit 74 but it will be within the skill of the worker in the art to provide one where necessary. In order to catch the overflow from the cooling operation we provide a tank or basin 76 in the base of the apparatus as shown in Figures 3 and 4.

The main drive motor 26 is connected to the power lines 77 through an ammeter 78, a rheostat 79, and a hand switch 80. Additionally there will be in the motor circuit such automatic cutouts and control boxes as are consonant with good electrical practice, and these we have not illustrated.

A speed indicator 81 may be connected with the main shaft 15 to give a direct speed reading. For more accurate speed determination we couple to the shaft 15 a selsyn generator 82. This is connected by appropriate wiring 83 to a selsyn motor 84, turning a shaft 85. A stroboscopic disc 86 or other stroboscopic element is affixed to the shaft 85. The shaft 85 through an action of the selsyn motor and generator turns at the same speed as the shaft 15. We place on the shaft 85 a revolution counter 87. 88 indicates a glow lamp illuminator arranged with an oscillating circuit of controllable frequency so as to illuminate the stroboscopic element 86 with light pulses at the said frequency. As will be evident when the frequency of the light pulses bears the required relationship to the actual rotative speed of the shaft 85, the stroboscopic element, illuminated by the light pulses, will appear to stand still. This gives a very accurate way of bringing up the speed of the shaft 15 to the required value and maintaining it thereat if desired.

The testing conditions produced by the machine are very severe; and a great deal of noise is produced so that we preferably locate the apparatus of Figures 1 to 4 in one room, and in a second room closed from the first preferably with sound proof partitions, we locate the control apparatus consisting fundamentally of the ammeter 78, rheostat 79 and hand switch 80 for the main motor, the valves 60, 68, 71 and 75 for the hydraulic systems, and the cooling bath respectively, the speed indicator 81, the stroboscopic arrangements 84, 85, 86, 88 and the speed counter 87. These elements may be located upon a suitable control desk or upon the walls of the room adjacent the said desk. Preferably also, in the partition between the two rooms we provide a glass viewing panel, preferably of soundproof construction through which the operation of the apparatus may be watched.

Also it is advisable to house the immediate mechanism of Figures 1, 3 and 4. The side frame members 11 and 12 on the frame may serve as side housings. Doors 89 and 90 may be mounted across the front of the apparatus and provided with a suitable bolt. Also to permit a view of conditions at the wheel, glass panels 91 and 92 may be mounted in the doors. The top of the frame may be provided with a cover 93 in Figure 4, and the rear may be closed by a partition 95. During severe brake applications much metal dust is formed and floats in the air within the enclosure, so that we find it advisable to vent the enclosure. This may be accomplished by means of a fan 96 delivering air through a conduit 97, through, say a wall 98 of the room to the outer air. The intake side of the fan may be connected by a conduit 99 to a suitable opening in the rear of the back cover plate 95. A screen 100 to catch the larger particles may be provided over this opening if desired. Such provision for venting the housing will make the working conditions in the room containing the apparatus of Figures 1 to 4 very much better.

Also in heavy brake applications made under the severe conditions which our apparatus is capable of producing, the rim of the wheel under test may become hot enough to glow. Similar heats are, of course, built up in intensified form in the brake shoes and particles of metal from the brake shoes adhere to the wheel under test. Where the axle load apparatus is employed to simulate conditions of axle loading under severe brake applications these particles of metal are likely to be picked up by the rail wheel 44 so that the action of this wheel particularly as regards the shelling tests and the like, may be impeded. To this end and to restore the contour which may be worn down during the testing we provide grinding means for the rail wheel. The grinding means may have any one of a number of forms. We have illustrated it in a simple form in which a bracket 101 is mounted slidably upon the brackets 50 and carries a motor 102 and grinding wheel 103. A feeding device for the bracket 101 comprises a threaded shaft 104 having a rotary connection with the bracket 101, threaded into a frame member, and provided with a hand wheel 105. With the rail wheel 44 being rotated by the wheel 17 the grinder can be used to dress the surface of the wheel 44 either during the actual running of the test or at the conclusion of a test. This grinder may also be adapted to recondition the tread of the test wheel by repositioning the brackets 50 and 101.

A wide variety of tests may be made on the apparatus which we have just described. By way of example, we may test the wheel by subjecting it to brake applications of any desired degree of severity. All combinations of brake pressure, wheel speed, and time of application are possible either with or without the rolling contact with the rail wheel which can be used with a widely varying load if desired. The manner of conducting these tests and the use of the apparatus for the purpose will be clear from the description of the apparatus which has been given above. The severe braking applications are rapidly productive of thermal cracks if the material has thermal cracking characteristics.

The operation of the wheel under severe loads can be tested and the tendency of the wheel to develop the phenomenon known as shelling may in this way be determined. The tests to which we have referred are exemplary only of a wide variety of tests which may be performed on the machine.

The above description covers one means of accomplishing the objects of our invention. Certain variations can be employed such as using only one or using two or more brake shoes, variously located around the periphery of the wheel, other means of supporting the brake shoe holders and forcing them against the wheel, other means of forcing the rail wheel against the test wheel, other means of determining the speed of the test wheel, other means of restoring the contour of the rail and test wheels, and the use of abrasive brake shoes for wear testing.

These and other modifications in the apparatus may be made by the skilled worker in the art without departing from the spirit of our invention as will be evident.

Having thus described our invention, what we claim as new and desire to secure by Letters Patent is:

1. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid.

2. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at opposite sides of the periphery of its rim, and means for rapidly cooling the said wheel to be tested by flooding said wheel with cooling fluid.

3. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at opposite sides of the periphery of its rim, means for rapidly cooling the said wheel to be tested by flooding said wheel with cooling fluid, and means for selectively operating said pressure means.

4. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means being mounted on said framework.

5. A device for testing car wheels comprising a spindle upon which a car wheel to be tested may be mounted rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means being mounted on said framework, means slidably mounted in said framework above said spindle, a shaft journaled in said means, a pressure device for forcing said means downwardly, and a wheel mounted on said shaft and adapted to bear on the surface of the wheel under test under selected loads applied in a manner similar to the axle loads encountered in railroad rolling stock.

6. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means mounted on said framework, means slidably mounted in said framework above said spindle, a shaft journaled in said means, a pressure device for forcing said means downwardly, and a wheel to simulate the pressure of a railroad rail mounted on said shaft and adapted to bear on the surface of the wheel under test under selected loads applied in a manner similar to the axle loads encountered in railroad rolling stock, and housing means on said framework enclosing said elements.

7. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means mounted on said framework, means slidably mounted in said framework above said spindle, a shaft journaled in said means, a pressure device for forcing said means downwardly, and a wheel mounted on said shaft and adapted to bear on the surface of the wheel under test under selected loads applied in a manner similar to the axle loads encountered in railroad rolling stock, housing means on said framework enclosing said elements, and means in the lower part of said housing for catching and retaining said cooling fluid.

8. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means mounted on said framework, means slidably mounted in said framework above said spindle, a shaft journaled in said means, a pressure device for forcing said means downwardly, and a wheel mounted on said shaft and adapted to bear on the surface of the wheel under test under selected loads applied in a manner similar to the axle loads encountered in railroad rolling stock, housing means on said framework enclosing said elements, means in the lower part of said housing for catching and retaining said cooling fluid, and power means for venting said housing to the outer air.

9. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means mounted on said framework, means slidably mounted in said framework above said spindle, a shaft journaled in said means, a pressure device for forcing said means downwardly, and a wheel mounted on said shaft and adapted to bear on the surface of the wheel under test under selected loads applied in a manner similar to the axle loads encountered in railroad rolling stock, and means for retracting said slidably mounted means comprising a pressure cylinder mounted on said framework, and a linkage and lever connection between said cylinder and said slidably mounted means.

10. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means mounted on said framework, means slidably mounted in said framework above said spindle, a shaft journaled in said means, a pressure device for forcing said means downwardly, and a wheel mounted on said shaft and adapted to bear on the surface of the wheel under test under selected loads applied in a manner similar to the axle loads encountered in railroad rolling stock, grinding means for dressing the surface of at least one of said wheels, and feeding means for said grinding means.

11. A device for testing car wheels comprising a spindle upon which a car wheel to be tested may be mounted, rotating mass means connected with said spindle to simulate the inertia of railway rolling stock under conditions of service, motive means for said spindle, pressure means, shoe means between said pressure means and said wheel for applying braking pressure to said wheel at at least one side of the periphery of its rim, and means for rapidly cooling the said wheel to be tested by flooding said wheel with cooling fluid, said device comprising a framework, said spindle being journaled on said framework, and said pressure means constituting fluid pressure means being mounted on said framework slidably, and means on said framework providing back stops for said fluid pressure means so that the position of said fluid pressure means can be adjusted by means of shims interposed between said fluid pressure means and said back stops.

12. In a car wheel testing device, a spindle for mounting a wheel to be tested, rotating mass means connected with said spindle to simulate the inertia of railway rolling stock under conditions of service, a motor for said spindle, fluid pressure means for applying a brake to said wheel, a source of fluid pressure for said last mentioned means and a feed line comprising a control valve, a power feed line for said motor including an ammeter and a manually controlled rheostat means for varying the speed of rotation of said spindle, means for flooding said wheel with cooling fluids, and a control valve for said last mentioned means.

13. A device for testing car wheels comprising a spindle upon which a car wheel to be tested may be mounted, rotating mass means connected with said spindle to simulate the inertia of railway rolling stock under conditions of service, motive means for said spindle, shoe means for applying braking pressure to said wheel at opposite sides of the periphery of its rim, pressure means acting on said shoe means, and means for rapidly cooling the said wheel to be tested by flooding said wheel with cooling fluid, said device comprising a framework, said spindle being journaled on said framework, and said pressure means constituting fluid pressure means being mounted on said framework slidably, and means on said framework providing back stops for said fluid pressure means so that the position of said fluid means can be adjusted by means of shims interposed between said fluid pressure means and said back stops, and speed indicating means for said wheel.

14. In an apparatus of the character described, a spindle for rotating a wheel to be tested, rotating mass means connected with said spindle to simulate the inertia of railway rolling stock under conditions of service, fluid pressure means for applying braking pressure to said wheel, a rail wheel for peripherally loading said wheel under test, fluid pressure means for applying pressure to said rail wheel, a heavily loaded accumulator, means for connecting and disconnecting said accumulator and said first mentioned fluid pressure means, a relatively lightly loaded accumulator, means for connecting and disconnecting said accumulator and said last mentioned fluid pressure means, and means for selectively connecting and disconnecting said last mentioned accumulator and said first mentioned fluid pressure means.

15. In apparatus of the character described, a spindle for rotating a wheel to be tested, rotating mass means connected with said spindle to simulate the inertia of railway rolling stock under conditions of service, motive means for rotating said spindle, means for applying a brake to said wheel, and means for loading the periphery of said wheel.

16. In apparatus of the character described, a spindle for rotating a wheel to be tested, rotating mass means connected with said spindle to simulate the inertia of railway rolling stock under conditions of service, motive means for rotating said spindle, means for applying a brake to said wheel, means for loading the periphery of said wheel, and means for rapidly cooling said wheel.

17. In apparatus of the character described, a spindle for rotating a wheel to be tested, rotating mass means connected with said spindle to simulate the inertia of railway rolling stock under conditions of service, motive means for rotating said spindle and means for selectively applying brakes to the periphery of said wheel at at least one side of said periphery and under controlled pressures.

18. In apparatus of the character described, a spindle to receive a wheel to be tested, rotating mass means connected with said spindle to simulate the inertia of railway rolling stock under conditions of service, means for applying braking pressure to the periphery of said wheel, rotary means for loading the periphery of said wheel during rotation, and means for dressing the surface of at least one of said wheels.

REID L. KENYON.
      HARRY TOBIN.
      ROY P. TOOKE.